(12) United States Patent
Okada

(10) Patent No.: US 10,395,460 B2
(45) Date of Patent: *Aug. 27, 2019

(54) PORTABLE TERMINAL DEVICE AND AUTHENTICATION SYSTEM

(71) Applicant: TOYOTA JIDOSHA KABUSHIKI KAISHA, Toyota-shi, Aichi-ken (JP)

(72) Inventor: Hiroki Okada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/253,692

(22) Filed: Jan. 22, 2019

(65) Prior Publication Data
US 2019/0156606 A1 May 23, 2019

Related U.S. Application Data

(63) Continuation of application No. 16/026,159, filed on Jul. 3, 2018, now Pat. No. 10,223,853.

(30) Foreign Application Priority Data

Aug. 9, 2017 (JP) ................. 2017-154577

(51) Int. Cl.
G07C 9/00 (2006.01)
H04B 1/7163 (2011.01)
H04W 4/80 (2018.01)
(52) U.S. Cl.
CPC ....... *G07C 9/00309* (2013.01); *H04B 1/7163* (2013.01); *H04W 4/80* (2018.02); *G07C 2009/00769* (2013.01)

(58) Field of Classification Search
CPC .... G07C 9/00309; H04W 4/80; H04B 1/7163
See application file for complete search history.

(56) References Cited

U.S. PATENT DOCUMENTS

2004/0203600 A1* 10/2004 McCorkle ............... G01S 7/023
455/411
2014/0285319 A1 9/2014 Khan et al.
(Continued)

FOREIGN PATENT DOCUMENTS

JP 2010-007457 A 1/2010

*Primary Examiner* — Nabil H Syed
(74) *Attorney, Agent, or Firm* — Oliff PLC

(57) ABSTRACT

A portable terminal device of an authentication system includes a first communication unit that performs wireless communication with a vehicle-mounted device by using a first frequency band, a second communication unit that performs ultra-wideband wireless communication using a second frequency band, a notification unit configured to perform a predetermined notification operation, and a first controller that controls the first communication unit, the second communication unit, and the notification unit. The first controller controls the first communication unit to perform wireless communication for authentication with the vehicle-mounted device, and controls the second communication unit to perform wireless communication for measuring a distance from the portable terminal device to the vehicle-mounted device. The first controller causes the notification unit to perform a predetermined notification operation when the first communication unit receives a radio signal indicating that distance measurement fails from the vehicle-mounted device.

20 Claims, 4 Drawing Sheets

(56) References Cited

U.S. PATENT DOCUMENTS

2014/0330449 A1* 11/2014 Oman ............... G01S 13/765
                                                    701/2
2018/0162321 A1* 6/2018 Spiess ............... B60R 25/246

* cited by examiner

PORTABLE TERMINAL DEVICE AND AUTHENTICATION SYSTEM

INCORPORATION BY REFERENCE

This is a Continuation of application Ser. No. 16/026,159 filed Jul. 3, 2018, which claims priority to Japanese Patent Application No. 2017-154577 filed on Aug. 9, 2017. The disclosure of the prior applications are hereby incorporated by reference herein in their entirety.

BACKGROUND

1. Technical Field

The disclosure relates to a portable terminal device used in a vehicle and an authentication system using a portable terminal device used in a vehicle.

2. Description of Related Art

A smart key system has been known as an authentication system for a vehicle. In the smart key system, a portable terminal device such as an electronic key carried by a user is authenticated by communicating with a vehicle-mounted device through short-range wireless communication, and thus, an action for a vehicle such as an action for unlocking or locking vehicle doors or an action for starting a vehicle engine is permitted (see Japanese Unexamined Patent Application Publication No. 2010-7457 (JP 2010-7457 A)).

Meanwhile, ultra-wideband (UWB) wireless communication (hereinafter, UWB communication) through which distance measurement is able to be performed with high precision has been suggested as one of the short-range wireless communication techniques. For example, a distance is able to be measured based on a transmission time of pulse waves through the UWB communication.

SUMMARY

In the smart key system, the authentication between the portable terminal device and the vehicle is performed, and a presence range of the portable terminal device is accurately detected in distance measurement using the UWB communication. When the smart key system determines whether or not to permit a vehicle operation based on the accurate detection, it is possible to further improve security or service quality. However, the UWB communication uses radio waves including a high frequency band which are difficult to be diffracted. The portable terminal device is shielded by a human body or metal from the vehicle-mounted device in a certain position of a pocket or a certain content of a bag that stores the portable terminal device, and thus, there is a possibility that communication will not be available. As a result, it is difficult for the portable terminal device to be applied to the smart key system.

The disclosure provides an authentication system that easily establishes communication using high-frequency waves between a portable terminal device and a vehicle-mounted device.

A first aspect of the disclosure relates to a portable terminal device. The portable terminal device includes a first communication unit configured to perform wireless communication with a vehicle-mounted device mounted on a vehicle by using a first frequency band, a second communication unit configured to perform ultra-wideband wireless communication using a second frequency band including a frequency higher than a frequency of the first frequency band, a notification unit that performs a predetermined notification operation, and a first controller configured to control the first communication unit, the second communication unit, and the notification unit. The first controller is configured to control the first communication unit to perform wireless communication for authentication with the vehicle-mounted device. The first controller is configured to control the second communication unit to perform wireless communication for measuring a distance from the portable terminal device to the vehicle-mounted device. The first controller is configured to control the notification unit to perform the predetermined notification operation when the first communication unit receives a radio signal indicating that distance measurement fails from the vehicle-mounted device.

According to the first aspect of the disclosure, when high-frequency waves for distance measurement are shielded and the communication is not available between the portable terminal device and the vehicle-mounted device, the portable terminal device can notify a user that the communication is not available, and can prompt the user to resolve the shielding. Therefore, it is possible to easily establish communication for distance measurement.

In the portable terminal device according to the first aspect, the notification unit may have a vibrator or a speaker, and the first controller may control the notification unit to perform the notification operation by generating vibration from the vibrator or generating sound from the speaker.

A second aspect of the disclosure relates to an authentication system including the portable terminal device, and a vehicle-mounted device mounted on a vehicle. The vehicle-mounted device includes a third communication unit configured to perform communication with the first communication unit, a fourth communication unit configured to perform communication with the second communication unit, and a second controller configured to control wireless communication performed by the third communication unit and the fourth communication unit and determine whether or not to permit a vehicle operation based on a predetermined action for the vehicle. The second controller is configured to control the third communication unit to perform wireless communication for authentication with the portable terminal device. The second controller is configured to control the fourth communication unit to perform wireless communication for measuring a distance from the vehicle-mounted device to the portable terminal device when authentication succeeds. The second controller is configured to permit the vehicle operation based on the predetermined action for the vehicle when the second controller detects that the portable terminal device is present within a predetermined distance when distance measurement succeeds.

According to the second aspect of the disclosure, a presence range of the portable terminal device in which the operation of the vehicle performed by the predetermined action is permitted can be accurately limited to a narrower range through the distance measurement. Thus, it is possible to further improve service quality while further improving security.

In the authentication system according to the second aspect, the second controller of the vehicle-mounted device may be configured to control the third communication unit to transmit a radio signal indicating that the distance measurement fails when the distance measurement fails.

According to the second aspect of the disclosure, when the high-frequency waves for distance measurement are shielded and the communication is not available between the vehicle-mounted device and the portable terminal device, the vehicle-mounted device can notify the portable terminal device that the communication is not available.

In the authentication system according to the second aspect, the second controller may be configured to control the third communication unit to transmit the radio signal indicating that the distance measurement fails when the distance measurement does not continuously succeed a predetermined number of times.

A third aspect of the disclosure relates to an authentication system. The authentication system includes the portable terminal device, and a vehicle-mounted device mounted on a vehicle. The vehicle-mounted device includes a fifth communication unit configured to perform communication with the first communication unit, a sixth communication unit configured to perform communication with the second communication unit, and a third controller configured to control wireless communication performed by the fifth communication unit and the sixth communication unit, detect a predetermined action for the vehicle, and control performing of a vehicle operation based on the predetermined action. The third controller is configured to control the fifth communication unit to perform wireless communication for authentication with the portable terminal device. The third controller is configured to control the sixth communication unit to perform wireless communication for measuring a distance from the vehicle-mounted device to the portable terminal device on a regular basis when authentication succeeds, and the third controller is configured to cause the vehicle to perform a vehicle operation based on the predetermined action when distance measurement succeeds in the wireless communication performed by the sixth communication unit within a predetermined period of time before and after a point of time when the predetermined action is detected and presence of the portable terminal device within a predetermined distance is detected, in a case where the predetermined action is detected.

According to the third aspect of the disclosure, since a presence range of the portable terminal device in which the operation of the vehicle performed by the predetermined action is performed can be accurately limited to a narrower range through the distance measurement, it is possible to further improve service quality while further improving security.

In the authentication system according to the third aspect, the third controller of the vehicle-mounted device may be configured to control the fifth communication unit to transmit a radio signal indicating that the distance measurement fails when the distance measurement fails in the wireless communication performed by the sixth communication unit within a predetermined period of time from a point of time when the predetermined action is detected in a case where the predetermined action is detected.

According to the third aspect of the disclosure, when the high-frequency waves for distance measurement are shielded and the communication is not available between the vehicle-mounted device and the portable terminal device, the vehicle-mounted device can notify the portable terminal device that the communication is not available. Since the notification is not performed until the predetermined action is detected, it is possible to further suppress unnecessary notification performed by the portable terminal device.

In the authentication system according to the third aspect, the predetermined action may be a touch action for a door handle.

In the first to third aspects, the first frequency band may range from 300 MHz to 400 MHz.

In the first to third aspects, the second frequency band may range from 3 GHz to 10 GHz.

According to the aspects of the disclosure, when the high-frequency waves are shielded and the communication is not available between the portable terminal device and the vehicle-mounted device, since the portable terminal device can notify the user that the communication is not available and prompt the user to resolve the shielding, it is possible to provide the authentication system that easily establishes the communication using the high-frequency waves.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

Figure 1:
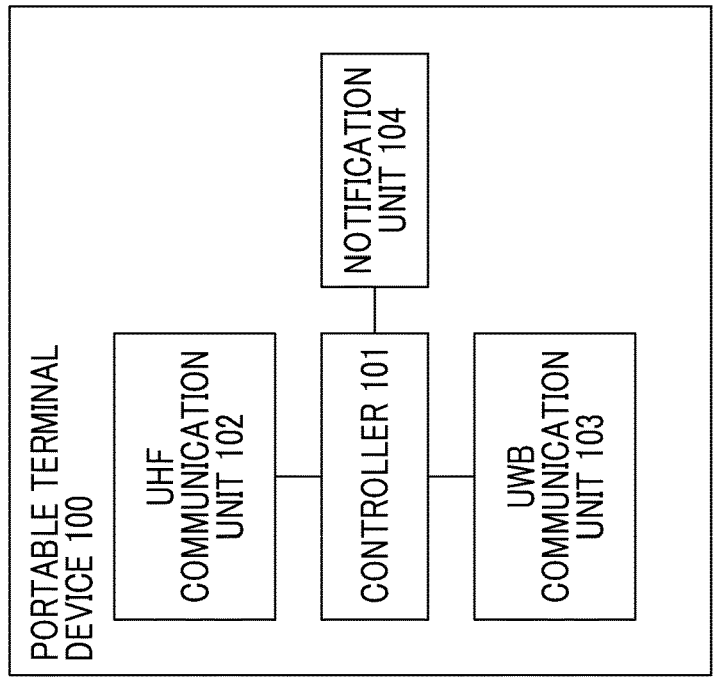
FIG. 1 is a functional block diagram of an authentication system according to first and second embodiments of the disclosure.
Figure 1:
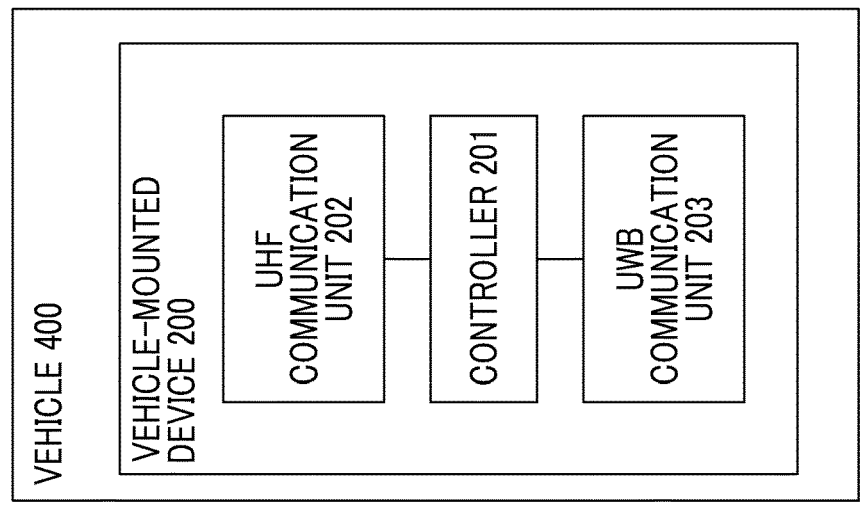

In an authentication system according to aspects of the disclosure, it is possible to further improve security or quality by specifying an accurate presence range of a portable terminal device through distance measurement, in addition to authentication. When high-frequency waves for distance measurement are shielded and communication is not available between the portable terminal device and a vehicle-mounted device, since the portable terminal device can notify a user that the communication is not available and prompt the user to resolve the shielding, it is possible to easily establish the communication for distance measurement.

First Embodiment

Hereinafter, an embodiment of the disclosure will be described in detail by referring to the drawings.

Configuration

FIG. 1 is a functional block diagram of an authentication system 10 according to the present embodiment. The authentication system 10 includes a portable terminal device 100, and a vehicle-mounted device 200 mounted on a vehicle 400.

The portable terminal device 100 includes an ultra-high frequency (UHF) communication unit 102 functioning as a first communication unit, an ultra-wideband (UWB) communication unit 103 functioning as a second communication unit, a controller 101 functioning as a first controller, and a notification unit 104. The vehicle-mounted device 200 includes a UHF communication unit 202 functioning as a third communication unit, a UWB communication unit 203 functioning as a fourth communication unit, and a controller 201 functioning as a second controller.

The portable terminal device 100 and the vehicle-mounted device 200 mainly perform communication for authentication by respectively using the UHF communication units 102, 202. Although it has been in the present embodiment that radio waves having a frequency band of, for example, 300 to 400 MHz, are used in the above-described communication, radio waves having another frequency band may be used. For example, radio waves having an LF band may be partially used.

The portable terminal device 100 and the vehicle-mounted device 200 mainly perform communication for distance measurement by respectively using the UWB communication units 103, 203. Radio waves including frequencies of a frequency band higher than a frequency band of the radio waves used by the UHF communication units 102, 202 are used in the above-described communication. For example, the UWB communication using a frequency band of 3 to 10 GHz is performed in the present embodiment.

The notification unit 104 of the portable terminal device 100 has a vibrator or a speaker, and can alert a user who carries the portable terminal device 100 by generating vibration or sound.

The functions of the units of the portable terminal device 100 and the vehicle-mounted device 200 are controlled by the controllers 101, 201, respectively.

Wireless Communication

Figure 2:
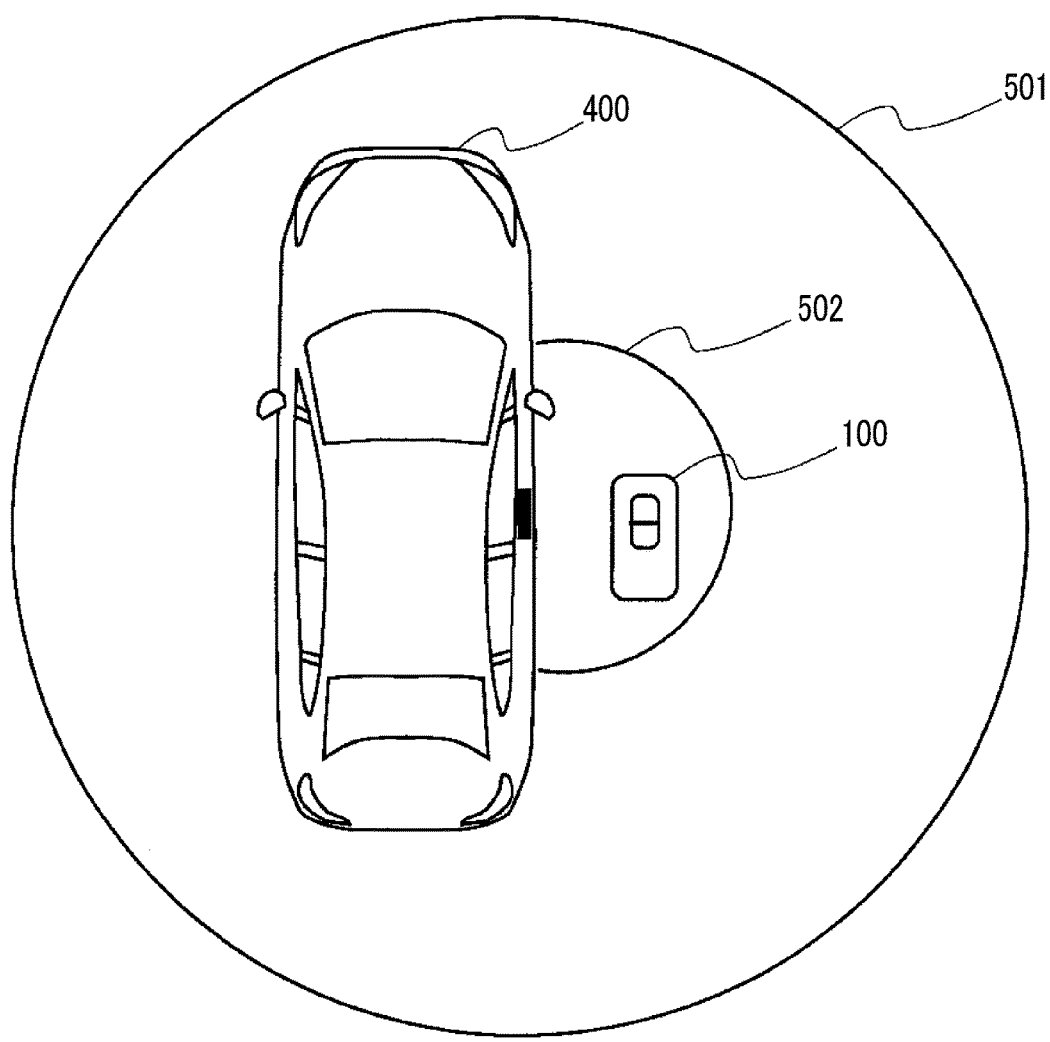
FIG. 2 is a diagram showing an example of an available communication range and a predetermined distance range used in result determination of communication for distance measurement according to the first and second embodiments of the disclosure.

FIG. 2 shows an example of an available communication range. An available communication range 501 of the UHF communication units 102, 202 is a range of about 10 m or less from an antenna provided in the vehicle 400. That is, it is possible to perform authentication as long as the portable terminal device 100 is within the available communication range 501.

Processing

Figure 3:
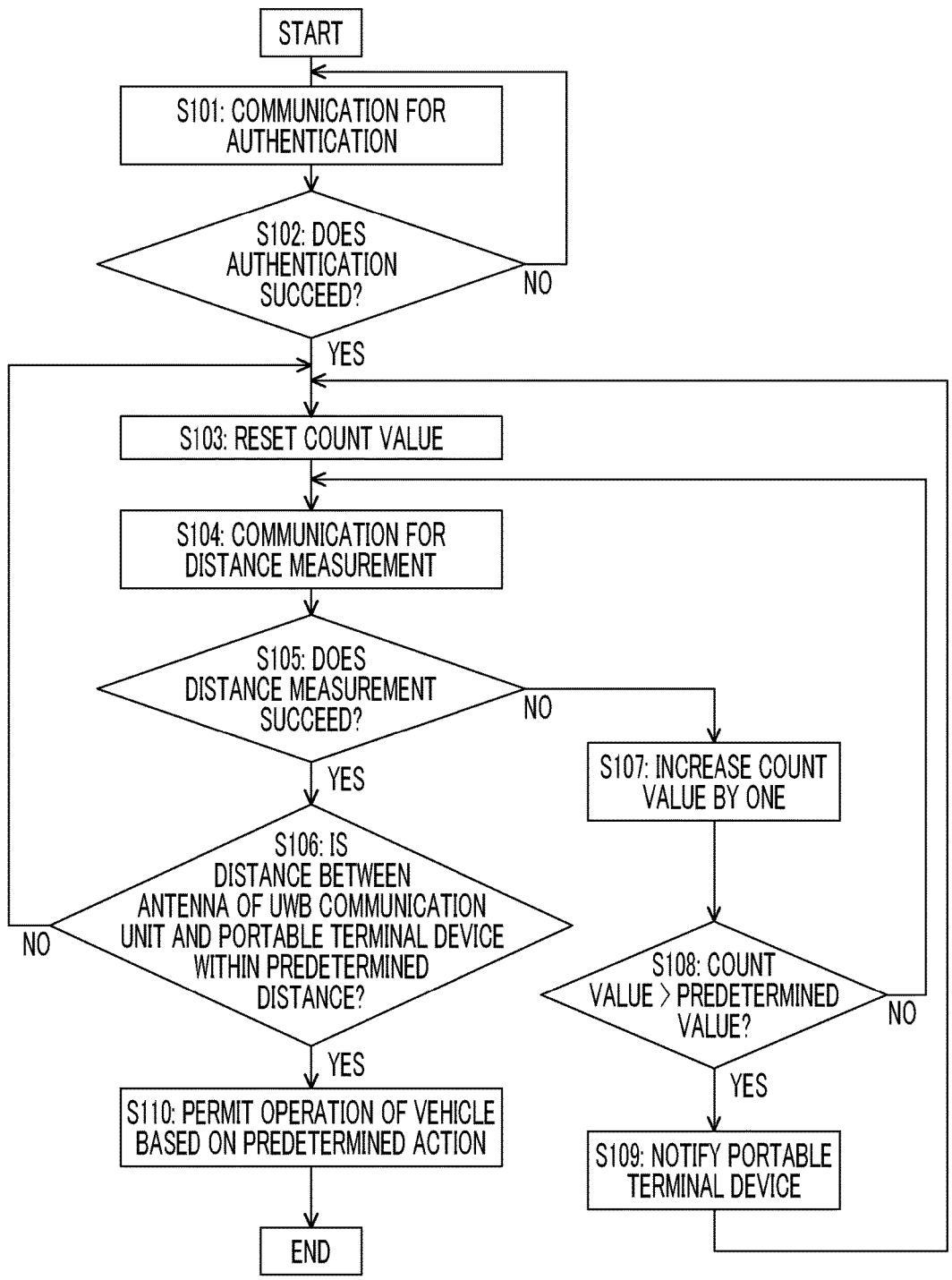
FIG. 3 is a flowchart showing processing according to the first embodiment of the disclosure.

FIG. 3 is a flowchart showing processing performed by the vehicle-mounted device 200 when the portable terminal device 100 enters the available communication range 501 of the UHF communication units 102, 202. The processing will be described with reference to FIG. 3.

Step S101: the controller 201 of the vehicle-mounted device 200 performs communication for authentication with the UHF communication unit 102 controlled by the controller 101 of the portable terminal device 100 by using the UHF communication unit 202.

Step S102: the controller 201 of the vehicle-mounted device 200 determines whether or not the authentication succeeds based on the communication result. For example, the authentication is performed by obtaining an identifier of the portable terminal device 100 through encryption communication and collating the obtained identifier. The processing proceeds to step S103 when the authentication succeeds, and returns to step S101 when the authentication does not succeed. When the communication with the portable terminal device 100 is lost, since there is a relatively high possibility that the portable terminal device 100 will be out of the available communication range 501 of the UHF communication units 102, 202, the processing of the present flowchart is stopped. Even though the authentication succeeds, the communication between the UHF communication units 202, 102 is performed on a regular basis in parallel with the subsequent processing, and the processing of the present flowchart is stopped when the communication with the portable terminal device 100 is lost.

Step S103: a value is set to zero by initializing a counter for counting the number of times of continuous failures of the subsequent communication for distance measurement.

Step S104: the controller 201 of the vehicle-mounted device 200 performs communication for distance measurement with the UWB communication unit 103 controlled by the controller 101 of the portable terminal device 100 by using the UWB communication unit 203.

Step S105: the controller 201 of the vehicle-mounted device 200 determines whether or not the distance measurement succeeds based on the communication result. The processing proceeds to step S106 when the distance measurement succeeds, and proceeds to step S107 when the distance measurement does not succeed. When the distance measurement does not succeed, there is a relatively high possibility that the portable terminal device 100 will be within the available communication range 501 of the UHF communication units 102, 202 and will be shielded by a human body or metal such as a laptop within a bag from the antenna.

Step S106: the controller 201 of the vehicle-mounted device 200 determines whether or not a distance between the antenna of the UWB communication unit 203 and the portable terminal device 100, which is indicated by the result of the distance measurement, is within a predetermined distance. It is preferable that the predetermined distance is, for example, a value which is less than an available communication distance of the UHF communication units 102, 202, and may be equal to or less than, for example, 2 m. FIG. 2 shows an example of a range 502 within the predetermined distance described above. As the determination result, the processing proceeds to step S110 when the distance between the antenna of the UWB communication unit 203 and the portable terminal device 100 is within the predetermined distance, and proceeds to step S103 when the distance between the antenna of the UWB communication unit 203 and the portable terminal device 100 is not within the predetermined distance.

Step S107: the controller 201 of the vehicle-mounted device 200 increases a count value by one.

Step S108: the controller 201 of the vehicle-mounted device 200 determines whether or not the count value exceeds a predetermined value. The processing proceeds to step S109 when the count value exceeds the predetermined value, and returns to step S104 when the count value does not exceed the predetermined value. For example, the predetermined value may be set to three.

Step S109: since the distance measurement does not continuously succeed a predetermined number of times, the controller 201 of the vehicle-mounted device 200 transmits a radio signal indicating that the distance measurement fails through the UHF communication unit 202. When the UHF communication unit 102 receives the radio signal indicating that the distance measurement fails, the controller 101 of the portable terminal device 100 activates the notification unit 104. Accordingly, the controller 101 of the portable terminal device 100 notifies the user that the distance measurement fails. Thereafter, the processing proceeds to step S103. The user is alerted through the notification, and moves the portable terminal device 100 by changing their posture or direction or moving their bag. Therefore, the shielding is resolved, and thus, there is a higher possibility that the subsequent distance measurement will succeed.

Step S110: the controller 201 of the vehicle-mounted device 200 permits the operation of the vehicle based on a predetermined action. For example, when the antenna of the UWB communication unit 203 is provided near a door handle of the vehicle 400, a touch action is performed on the door handle, and thus, an unlock operation of the vehicle 400 is performed. Although the processing performed before a predetermined operation is permitted is ended with this, the distance measurement is repeated, and the permission of the predetermined operation may be canceled when the distance measurement does not succeed or the distance between the antenna of the UWB communication and the portable terminal device is not within the predetermined distance.

Effects

By performing the above-described processing, since the presence range of the portable terminal device 100 in which the operation of the vehicle performed by the predetermined action is permitted is able to be accurately limited to a narrower range through the distance measurement using the UWB communication, it is possible to further improve service quality while further improving security. For example, when the antenna of the UWB communication unit 203 is provided near a driver seat, the authentication system can determine that the portable terminal device 100 is present on the driver seat within the vehicle with higher precision. Accordingly, the authentication system can determine whether or not to permit an engine starting operation through the pressing of an engine starting button. When the portable terminal device 100 is shielded from the antenna of the UWB communication unit 203, the portable terminal device can prompt the user to resolve the shielding.

Second Embodiment

Hereinafter, an embodiment of the disclosure will be described in detail by referring to the drawings.

Configuration

The functional blocks of an authentication system 20 according to the present embodiment are the same as those of the authentication system 10 according to the first embodiment shown in FIG. 1, and thus, the units thereof will be assigned the same reference numerals. The authentication system 20 includes a portable terminal device 100, and a vehicle-mounted device 200 mounted on a vehicle 400. The portable terminal device 100 includes a UHF communication unit 102 functioning as a first communication unit, a UWB communication unit 103 functioning as a second communication unit, a controller 101 functioning as a first controller, and a notification unit 104. The vehicle-mounted device 200 includes a UHF communication unit 202 functioning as a fifth communication unit, a UWB communication unit 203 functioning as a sixth communication unit, and a controller 201 functioning as a third controller.

Processing

Figure 4:
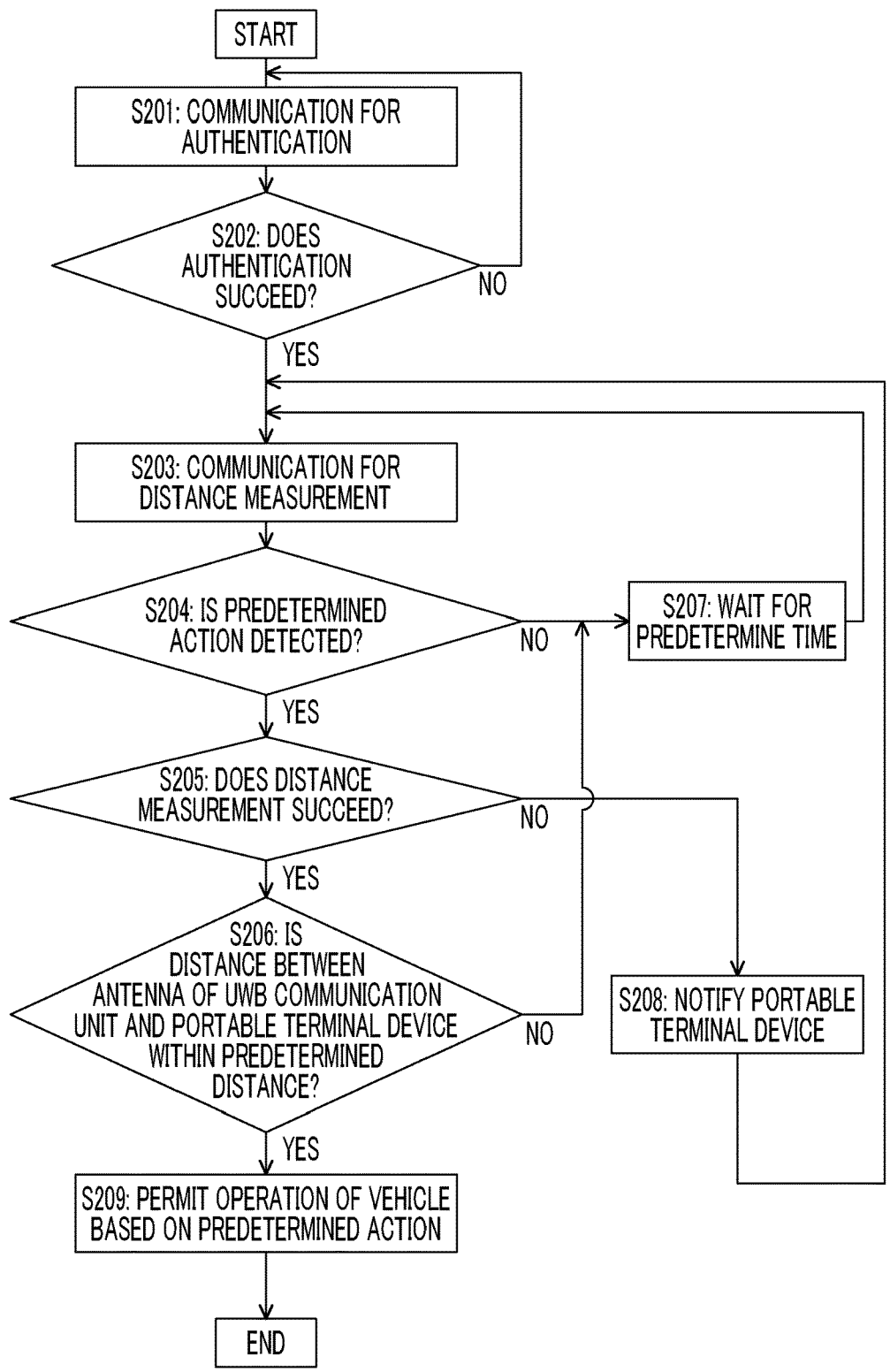
FIG. 4 is a flowchart showing processing according to the second embodiment of the disclosure.

Processing in the present embodiment is different from the processing performed in the first embodiment. FIG. 4 is a flowchart showing processing performed by the vehicle-mounted device 200 when the portable terminal device 100 according to the present embodiment enters an available communication range 501 of the UHF communication units 102, 202. The processing will be described with reference to FIG. 4.

Step S201: the controller 201 of the vehicle-mounted device 200 performs communication for authentication with the UHF communication unit 102 of the portable terminal device 100 by using the UHF communication unit 202.

Step S202: the controller 201 of the vehicle-mounted device 200 determines whether or not the authentication succeeds based on the communication result. For example, the authentication is performed by obtaining an identifier of the portable terminal device through encryption communication, and collating the obtained identifier. The processing proceeds to step S203 when the authentication succeeds, and returns to step S201 when the authentication does not succeed. When the communication with the portable terminal device 100 is lost, since there is a relatively high possibility that the portable terminal device 100 will be out of the available communication range 501 of the UHF communication units 102, 202, the processing of the present flowchart is stopped. Even though the authentication succeeds, the communication between the UHF communication units 102, 202 is performed on a regular basis in parallel with the subsequent processing, and the processing of the present flowchart is stopped when the communication with the portable terminal device 100 is lost.

Step S203: the controller 201 of the vehicle-mounted device 200 performs communication for distance measurement with the UWB communication unit 103 of the portable terminal device 100 by using the UWB communication unit 203.

Step S204: the controller 201 of the vehicle-mounted device 200 determines whether or not a predetermined action for the vehicle such a touch action for the door handle is detected. The processing proceeds to step S205 when the predetermined action for the vehicle is detected, and proceeds to step S207 when the predetermined action for the vehicle is not detected.

Step S205: the controller 201 of the vehicle-mounted device 200 determines whether or not the distance measurement succeeds based on the communication result. The processing proceeds to step S206 when the distance measurement succeeds, and proceeds to step S208 when the distance measurement does not succeed. When the distance measurement does not succeed, there is a relatively high possibility that the portable terminal device 100 will be within the available communication range 501 of the UHF communication units 102, 202 and will be shielded by a human body or metal such as a laptop within a bag from the antenna of the UWB communication unit 203.

Step S206: the controller 201 of the vehicle-mounted device 200 determines whether or not a distance between the antenna of the UWB communication unit 203 and the portable terminal device 100, which is indicated by the result of the distance measurement, is within a predetermined distance. It is preferable that the predetermined distance is, for example, a value which is less than an available communication distance of the UHF communication units 102, 202, and may be equal to or less than, for example, 2 m. As the determination result, the processing proceeds to step S209 when the distance between the antenna of the UWB communication unit 203 and the portable terminal device 100 is within the predetermined distance, and proceeds to step S207 when the distance between the antenna of the UWB communication unit 203 and the portable terminal device 100 is not within the predetermined distance. Although the communication for distance measurement is performed at predetermined time intervals multiple times, it is preferable that a distance measurement result at a point of time closest to a point of time when the predetermined action is detected is used in the determination. When the distance between the antenna of the UWB communication unit 203 and the portable terminal device 100 is not within the predetermined distance, the authentication system can determine that the detected predetermined action is not performed by the user.

Step S207: the controller 201 of the vehicle-mounted device 200 waits for a predetermined time. For example, the predetermined time may be 0.5 seconds. Therefore, the processing proceeds to step S203.

Step S208: since the distance measurement does not succeed, the controller 201 of the vehicle-mounted device 200 transmits a radio signal indicating that the distance measurement fails by using the UHF communication unit 202. When the UHF communication unit 102 receives the radio signal indicating that the distance measurement fails, the controller 101 of the portable terminal device 100 activates the notification unit 104. Accordingly, the controller 101 of the portable terminal device 100 notifies the user that the distance measurement fails. Thereafter, the processing proceeds to step S203. Since the user is alerted through the notification and moves the portable terminal device 100 by changing their posture or direction or moving their bag, the shielding is resolved, and there is higher possibility that the subsequent distance measurement will succeed.

Step S209: the controller 201 of the vehicle-mounted device 200 performs the operation of the vehicle based on the detected predetermined action. For example, when the antenna of the UWB communication unit 203 is provided near the door handle of the vehicle 400 and the controller of the vehicle-mounted device detects that the touch action for the door handle is performed in step S204, the unlock operation of the vehicle 400 is actually performed. Although the processing performed before the predetermined operation is performed is ended, step S203 and the subsequent processing may be repeated in order to detect another predetermined action.

Effects

By performing the above-described processing, since the presence range of the portable terminal device 100 in which the operation of the vehicle performed by the predetermined action is performed is able to be accurately limited to a narrower range through the distance measurement using the UWB communication, it is possible to further improve service quality while further improving security. When the portable terminal device 100 is shielded from the antenna of the UWB communication unit 203, the portable terminal device can prompt the user to resolve the shielding. In the present embodiment, since the notification unit 104 does not perform a notification operation until the predetermined action for the vehicle is performed even though the distance measurement fails, it is possible to further reduce a possibility that unnecessary notification will be performed. The communication for distance measurement will be performed within a predetermined period of time after the predetermined action is detected, and the operation of the vehicle may be performed when the communication for distance measurement succeeds and the portable terminal device is within the predetermined distance.

In both the embodiments, when a plurality of antennas of the UWB communication unit 203 of the vehicle-mounted device 200 is provided, the position of the portable terminal device can be more accurately specified, and a service which more precisely corresponds to a position of the user can be performed.

Aspects of the disclosure may be comprehended as a method performed by a plurality of computers each having a processor in addition to the system including the vehicle-mounted device and the portable terminal device. The disclosure may also be comprehended as the vehicle-mounted device and the portable terminal device constituting the system.

The aspects of the disclosure is applicable to the authentication system of the vehicle.

What is claimed is:

1. An apparatus mounted on a vehicle, which communicates with a portable device, the apparatus comprising:
a first communication unit, comprising a transceiver, configured to perform wireless communication with a portable device by using a first frequency band;
a second communication unit, comprising a transceiver, configured to perform wireless communication with the portable device using a second frequency band including a frequency higher than a frequency of the first frequency band;
a processor configured to:
authenticate the portable device based on a communication result of the first communication unit;
measure a distance between the apparatus and the portable device based on a communication result of the second communication unit; and
notify the portable device in response to (1) authenticating the portable device succeeding and (2) measuring the distance between the apparatus and the portable device failing.

2. The apparatus according to claim 1, wherein the processor is further configured to permit vehicle operation corresponding to an action of a user in response to (1) authenticating the portable device succeeding and (2) measuring the distance between the apparatus and the portable device succeeding.

3. The apparatus according to claim 2, wherein the processor is further configured to permit the vehicle operation in response to a distance measurement between the apparatus and the portable device being within a range of threshold values and does not permit the vehicle operation in response to the distance measurement is not within the range of threshold values.

4. The apparatus according to claim 2, wherein the action is a touch action for a door handle.

5. The apparatus according to claim 1, wherein the first frequency band ranges from 300 MHz to 400 MHz.

6. The apparatus according to claim 1, wherein the second frequency band ranges from 3 GHz to 10 GHz.

7. The apparatus according to claim 1, further comprising:
a controller configured to
control the first communication unit to perform wireless communication for authentication with the portable terminal device, and
control the second communication unit to perform wireless communication for measuring the distance from the vehicle-mounted device to the portable terminal device when authentication succeeds.

8. An authentication system comprising:
the apparatus according to claim 1; and
a portable device comprising:
a third communication unit, comprising a transceiver, configured to perform wireless communication with the first communication unit using the first frequency band;
a fourth communication unit, comprising a transceiver, configured to perform wireless communication with the second communication unit for measuring the distance with the apparatus and the portable device, wherein
the portable device is configured to receive a notification from the apparatus in response to (1) authenticating the portable device succeeding and (2) measuring the distance between the apparatus and the portable device failing.

9. The authentication system according to claim 8, wherein the portable device further comprises a controller configured to control the third communication unit to perform wireless communication with the first communication unit and control the fourth communication unit to perform wireless communication with the second communication unit.

10. A portable device, which communicates with an apparatus mounted on a vehicle, the portable device comprising:
- a first communication unit, comprising a transceiver, configured to perform wireless communication for authenticating with an apparatus mounted on a vehicle by using a first frequency band;
- a second communication unit, comprising a transceiver, configured to perform wireless communication for the apparatus to measure a distance between the apparatus and the portable device using a second frequency band including a frequency higher than a frequency of the first frequency band, wherein
- the portable device is configured to receive information in response to (1) the apparatus authenticating the portable device on the basis of a result of the wireless communication using the first frequency band succeeding and (2) the apparatus measuring a distance between the apparatus and the portable device failing.

11. The portable device according to claim 10, further comprising a processor configured to notify a user of the portable device in response to receiving information that the apparatus measuring a distance between the apparatus and the portable device failed.

12. The portable device according to claim 10, further comprising a controller configured to:
- control the first communication unit to perform the wireless communication for authentication with the apparatus, and
- control the second communication unit to perform the wireless communication for measuring the distance from the portable terminal device to the vehicle-mounted device.

13. A method comprising:
- performing wireless communication, using a first communication unit, comprising a transceiver, of an apparatus, with a portable device by using a first frequency band;
- performing wireless communication, using a second communication unit, comprising a transceiver, of the apparatus, with the portable device using a second frequency band including a frequency higher than a frequency of the first frequency band;
- authenticating the portable device based on a communication result of the first communication unit;
- measuring a distance between the apparatus and the portable device based on a communication result of the second communication unit; and
- notifying the portable device in response to (1) authenticating the portable device succeeded and (2) measuring the distance between the apparatus and the portable device failed.

14. The method of claim 13, further comprising permitting vehicle operation corresponding to an action of a user in response to (1) authenticating the portable device succeeding and (2) measuring the distance between the apparatus and the portable device succeeding.

15. A non-transitory computer readable medium storing a program that, when executed by a computer, causes the computer to execute a process, the process comprising:
- performing wireless communication, using a first communication unit, comprising a transceiver, of an apparatus, with a portable device by using a first frequency band;
- performing wireless communication, using a second communication unit, comprising a transceiver, of the apparatus, with the portable device using a second frequency band including a frequency higher than a frequency of the first frequency band;
- authenticating the portable device based on a communication result of the first communication unit;
- measuring a distance between the apparatus and the portable device based on a communication result of the second communication unit; and
- notifying the portable device in response to (1) authenticating the portable device succeeded and (2) measuring the distance between the apparatus and the portable device failed.

16. The non-transitory computer readable medium of claim 15, wherein the process further comprises permitting vehicle operation corresponding to an action of a user in response to (1) authenticating the portable device succeeding and (2) measuring the distance between the apparatus and the portable device succeeding.

17. A method comprising:
- performing wireless communication, using a first communication unit, comprising a transceiver, of a portable device, with an apparatus by using a first frequency band for authenticating the portable device;
- performing wireless communication, using a second communication unit, comprising a transceiver, of the portable device, with the apparatus using a second frequency band including a frequency higher than a frequency of the first frequency band for the apparatus to measure a distance between the apparatus and the portable device; and
- receiving, at the portable device, information in response to (1) the apparatus authenticating the portable device on the basis of a result of the wireless communication using the first frequency band succeeding and (2) the apparatus measuring a distance between the apparatus and the portable device failing.

18. The method of claim 17, further comprising notifying a user of the portable device in response to receiving information that the apparatus measuring a distance between the apparatus and the portable device failed.

19. A non-transitory computer readable medium storing a program that, when executed by a computer, causes the computer to execute a process, the process comprising:
- performing wireless communication, using a first communication unit, comprising a transceiver, of a portable device with an apparatus by using a first frequency band for authenticating the portable device;
- performing wireless communication, using a second communication unit, comprising a transceiver, of the portable device with the apparatus using a second frequency band including a frequency higher than a frequency of the first frequency band for the apparatus to measure a distance between the apparatus and the portable device; and
- receiving, at the portable device, information in response to (1) the apparatus authenticating the portable device on the basis of a result of the wireless communication using the first frequency band succeeding and (2) the apparatus measuring a distance between the apparatus and the portable device failing.

20. The non-transitory computer readable medium of claim 19, wherein the process further comprises notifying a user of the portable device in response to receiving information that the apparatus measuring a distance between the apparatus and the portable device failed.

* * * * *